(12) United States Patent
Chien (10) Patent No.: US 7,824,185 B2
(45) Date of Patent: Nov. 2, 2010

(54) OUTLET DEVICE WITH CHANGEABLE POSITION FEATURES

(76) Inventor: Tseng-Lu Chien, 8F, No. 29, Alley 73, Lin-Shen Road, Shi-Chi Town, Taipei Hseng (TW)

(*) Notice: Subject to any disclaimer, the term of this patent is extended or adjusted under 35 U.S.C. 154(b) by 0 days.

(21) Appl. No.: 12/232,035

(22) Filed: Sep. 10, 2008

(65) Prior Publication Data
US 2009/0011627 A1 Jan. 8, 2009

(51) Int. Cl.
*H01R 39/00* (2006.01)
(52) U.S. Cl. .......................................... 439/11
(58) Field of Classification Search .............. None
See application file for complete search history.

(56) References Cited

U.S. PATENT DOCUMENTS

| | | | |
|---|---|---|---|
| 6,004,138 A * | 12/1999 | Harbertson | 439/32 |
| 6,302,743 B1 * | 10/2001 | Chiu et al. | 439/652 |
| 6,940,015 B2 * | 9/2005 | Fang | 174/53 |
| 2007/0178756 A1 * | 8/2007 | Schriefer et al. | 439/535 |
| 2007/0230227 A1 * | 10/2007 | Palmer | 363/78 |

* cited by examiner

*Primary Examiner*—Edwin A. Leon
*Assistant Examiner*—Vanessa Girardi
(74) *Attorney, Agent, or Firm*—Bacon & Thomas, PLLC (57) ABSTRACT

An outlet device has position changeable features including at least one of outlet-unit with a plurality of resilient contacts and socket-set receiving-areas to connect with a device's electricity supply bus to deliver an electric signal from an electric signal source to the socket-set receiving-areas. The position of the outlet-units is changeable when a force applied to an outlet-unit or outlet-device, enabling the outlet device to accommodate all different sizes of plug.

17 Claims, 8 Drawing Sheets

OUTLET DEVICE WITH CHANGEABLE POSITION FEATURES

BACKGROUND OF THE INVENTION

This application has subject matter in common with U.S. patent application Ser. Nos. 12/149,963 ("Removable LED light device"); 12/073,889 ("LED track light device"); 12/073,095: ("LED light with changeable position with Preferable power source"); 12/007,076 ("LED light with changeable geometric system"); 12/003,691 ("LED light with changeable geometric dimension features"); 12/003,809 ("LED light with changeable features"); 11/806,711 ("Multiple LED light with adjustable angle features"); 11/527,631 ("LED Night light with interchangeable display unit"); 11/498,881 ("Poly Night light"); 11/255,981 ("Multiple light source Night Light"); 11/094,215 ("LED Night light with Liquid optics medium"); 11/092,741 ("Night light with fiber optics); 10/883,747 ("Fiber Optic light kits for footwear"); 11/498,874 ("Area Illumination for LED night light"); 11/527,629 ("Time Piece with LED night light"); 11/527,628 ("Multiple Function Night light with Air Freshener"); 11/806,284 ("LED Night light with more than one optics mediums"); 11/806,285 ("LED Night Light with multiple function"); 11/806,711 ("Multiple LEDs Light with adjustable angle function").

The current invention is especially related to U.S. patent application Ser. Nos. 12/149,963 ("Removable LED light device"); and 12/073,889 ("LED Track Light Device"). These applications disclose LED light devices with changeable position features for a track device, an expandable device, and a transform device, each of which uses LED light elements that require only a very small amount of electric power with low voltage and current.

The current invention provides a plurality of outlet-units to supply a large amount of electric power with higher voltage, current, and frequency. Hence, some of the conductive means, resilient conductive means, contact-means, related parts, and accessories need to meet safety standards so some arrangements need to be upgraded. However, a majority of the construction of the position changing mechanisms within the track-means, expendable means, foldable means, retractable means, or other equivalent means use the same basic mechanical concepts. Hence, all alternatives, replacements, or upgrades still fall within the scope of the current invention.

The major features of the current invention are as follows:

1. The outlet device with changeable position features of the invention is a device that supplied electric signals from an electric signal source, which may be a wall outlet, solar power, wind generator, electric signal generator (sound, audio, video), or equivalent electric signal source, to other devices to carry out desired functions.

2. The outlet device with changeable position features of the invention includes outlet-unit means having a required geometric shape and specification to receive and electrically connect a designated plug device to deliver electric signals an appropriate voltage, current, pulse, cycles, frequency, amperage, and/or other electric properties.

3. The outlet device with changeable position features of the current invention can be made by any method which and exhibit any of the following position changing movements: rotary, jumpable gap, extendable, foldable, distance, extractable, connectable, disconnectable, retractable, expandable, addable, adjustable, bendable, overlapable, underlayable, assembleable, disassembleable, or flexible to provide a convenient unit that fits all kind of spaces where people stay in any environment including indoors and outdoors.

4. The outlet unit means of the outlet device with changeable position features of the current invention may include conductive means, resilient conductive means, contact-means, and other related parts and accessories to build and deliver electric signals from one end to other end.

5. The outlet unit means of the outlet device with changeable position features of the invention may further have resilient contact means in the form of a clip or snap, that can be pushed, pressed, retracted, expanded, and/or made elastic or resilient ato ensure a good electric or mechanical connection so as to delivery the electric signal from a bus-means of the outlet device.

6. contact means of the outlet unit means of the outlet device with changeable position features of the invention may further be connected with bus means to supply the electric signal to an outlet-unit.

7. The outlet device with changeable position features of the current invention has a plurality of outlet units, with each unit having its own contact-means, conductive means, resilient conductive means, related parts and accessories within a geometric shape that fits within the outlet device.

8. The outlet device with changeable position features of the current invention may have multiple functions selected from the group including surge protection, power failure protection, audio in-out functions, video in-out functions, digital data transmission functions, blue tooth transmission functions, lighting functions, roller for wire functions, timer functions, sensor functions, and switching functions to cause the power device to offer more functions to the consumer.

9. The current invention outlet device with changeable position features may have any combination of conventional socket-sets selected from sockets for consumer electric devices, communication devices, computer devices, lighting devices, blue tooth devices, telephone devices or other electrical devices.

10. The outlet device with changeable position features of the current invention may have a geometric shape and space arrangement to allow the outlet device's wires and plug (if any) stored for use with an alternating current (AC) power source, wind generator, other electric generator device, or equivalent device.

11. The outlet device with changeable position features, of the invention also has a geometric shape and space arrangement that allows a solar module and related power storage-means (if has any) to be properly stored when the device incorporates solar power and rechargeable batteries.

12. The outlet device with changeable position features of the current invention may incorporate a safety curtain to provide safety isolation for all live-wires which have high voltage and current and which therefore need be covered to prevent people from touching at any time.

13. The contact means of the outlet device with changeable position of the current invention may be connected with bus means arranged along x-y-z axes, the bus means being on different surfaces or levels.

14. The outlet device with changeable position features of the current invention may be in the form of strips or a tape shape for plug-in, battery, or solar powered operation.

15. The receiving socket sets of the outlet device with changeable position features of the current invention may have their own contact means to provide electric connection to a bus means with a safe and convenient electric connection.

The current invention offers a very convenient outlet device in the form of strips or tape with changeable positioning so that people do not waste outlets based on limited space between each of the outlet-units of a conventional fixed-position outlet-device. This will help people even when using plugs of different sizes because the each adaptor-unit's position can be changed as desired.

The current invention furthermore has wider application to cover different light means, which may include an incandescent bulb, fluorescent lamp, halogen bulb, electro-luminescent elements, cold cathode tube, and any other conventional light means available from the marketplace and having a same function or equivalent functions to those of LEDs or LED-units to offer the illumination to all people, with the geometric shape, size, dimension changeable features providing each said light means with changeable features for orientation, position etc.

DRAWINGS

FIG. 4-1 shows details of the construction of a safety curtain for the fourth preferred embodiment, the safety curtain having different construction as required so long as the function can prevent people from touching the bus means.

DETAIL DESCRIPTION OF THE PREFERRED EMBODIMENTS

The current invention includes an outlet device with position changeable feature which provides a simple means to all people to change the positions of all outlet-units as needed. Currently, all power strips or power tapes are normally fixed in an unchangeable position. Because, in the conventional market, all outlet-units are fixed at a certain position, some big size plugs cannot fit within the limited space, resulting in waste since people need to buy a second set of power strips or power tapes to achieve a proper electric connection with a power source for the devices that do not fit into the first power strip or tape.

The current invention offers a position changeable outlet device that lets people adjust the position of each outlet-unit so that all outlet-units can properly be used to make electric connection with an electric device. The position changeable features of the current invention means can be achieved by a variety of means that permit rotary or other movements/adjustments including those that involve a jumpable gap and/or parts that are extendable, foldable, extractable, connectable, disconnectable, retractable, expandable, addable, adjustable, bendable, overlapable, underlayable, assembleable, dis-assembleable, or flexible.

Also, the current invention's receiving socket sets preferably have their own contact means so no wiring is necessary to connect the socket sets with power bus means. This is an advantageous design because it offers people convenient and safe electric connection for all outlet-units to the bus means (as above discussed feature 15)

Figure 1:
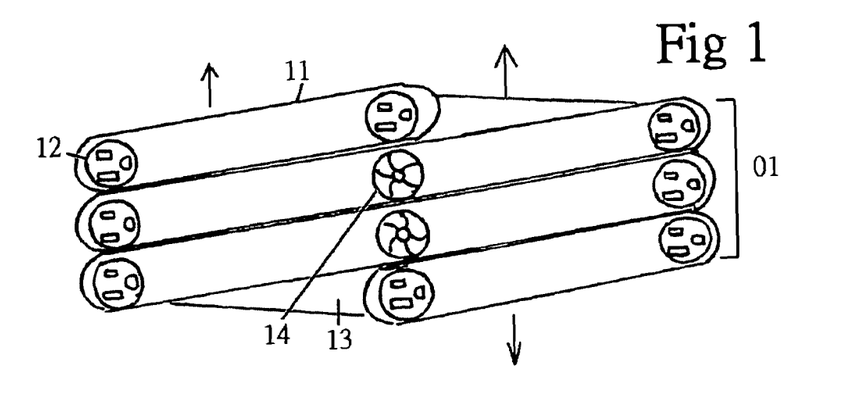
FIG. 1 shows a first preferred embodiment of an outlet device with position changeable features, with outlet-units installed on an extendable housing so that all of the outlet-units will have a different position whenever the housing is changed to a new configuration.

A detailed description of these features follows:

As shown in FIG. 1, an extendable outlet device (01) has housing-means (11) with a plurality of outlet-units (12) installed on the housing-means (11). Another device (14) which may be a light device, LED device, phone jack device, surge protector device, sensor device, switch device or other device available in the marketplace also can fit on the housing-means (11) to provide the outlet device with more features. Each of the outlet-units (12) may change position when a force is applied to the said housing-means (11) (13) and expand in another direction to make all outlet-units change position as desired.

Figure 2:
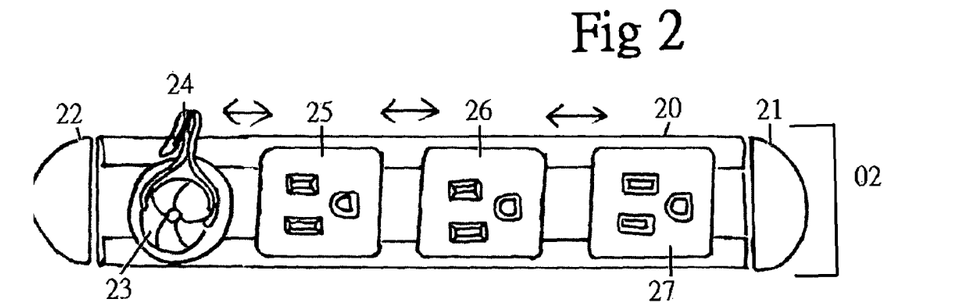
FIG. 2 shows a second preferred embodiment of an outlet device with position changeable features, in which outlet-units or other devices are installed on a track means to enable the outlet-units and other devices to provide desired functions.

As shown in FIG. 2, the outlet-units (25) (26) (27) are fitted within the track-means (20) in the same manner as the LED-unit (23) of the above-cited copending application Ser. No. 12/149,963, entitled "Removable LED light device." Each of the outlet-units has three socket-set receiving areas to connect with a plug's three parts to enable delivery of an electric signal from the outlet-device to other electric items.

Figure 3:
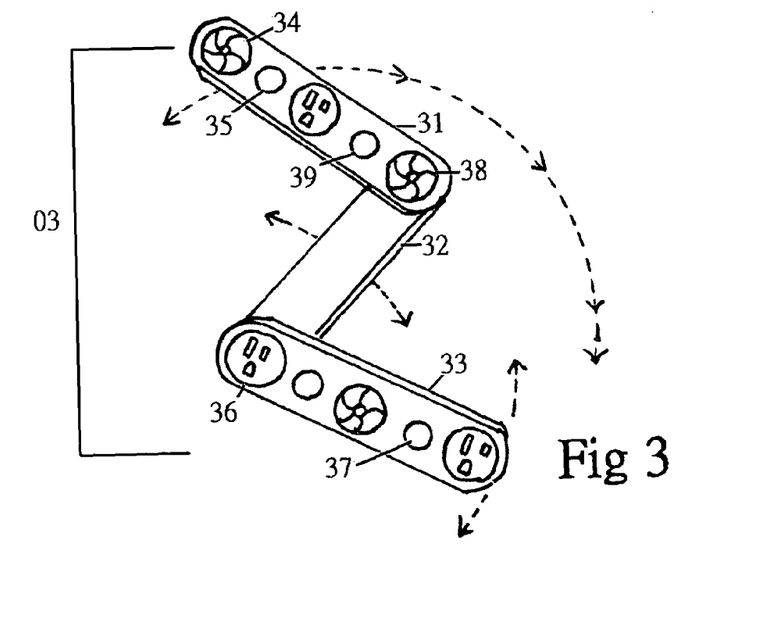
FIG. 3 and FIG. 16 show construction details of the first preferred embodiment that enable the outlet-units and other devices to change position when the housing has been moved to a new orientation or position.

As shown in FIG. 3, the outlet device (03) includes two long housing-means (31) (33) and one short joint-means (32). Each of the housing means (31) (33) can be rotated to the left and right as needed. Each of the long housing means further has a plurality of outlet-units (38), other devices (34), switch means (35), or sensor means (39), or other any electric device (37). The joint means (32) has rotatable bus-means (not shown) within to deliver an electric signal from the housing means (31) to the next housing means (33).

Figure 4:
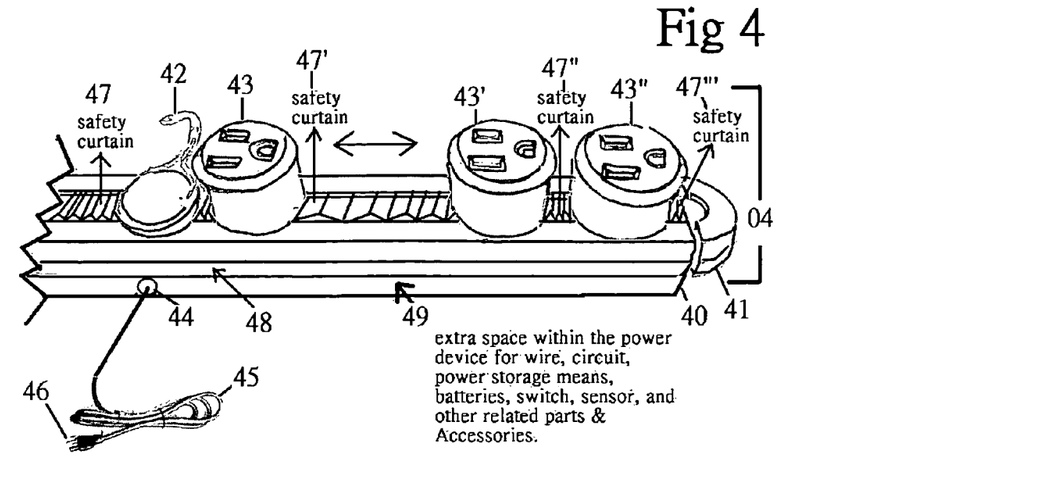
FIG. 4 shows details of a third preferred embodiment of an outlet device with changeable position features, including a 110 Volt alternating current power source with an electric cord and plug means, and a security curtain to prevent from the people touching the bus means.

As shown in FIG. 4, the outlet-device (04) has a plurality of outlet-units (43) (43') (43") and other devices (42) on its track-means (40). The electric signal source is from a wall outlet (alternating current (AC)) so san electric cord (45) and plug (46) are provided to connect with the wall outlet to get the electric signal. The electric signal is supplied to the outlet-device (04) from the side hole (44) to an inner plurality of bus means (not shown), and each bus means connects with the contact means of each outlet-unit (43) (43' (43"). A safety curtain (47) (47') (47") (47") fits within each space between the outlet-units (43) (43') (43") (43"") or other device (42) to prevent people from touching live wires which have a high voltage and high current. The safety curtain (47) (47') (47") (47"") can b made of a UL required material with extendable and foldable features so as to make sure that every space between the outlet-units will be covered by the safety curtain without any hole that allows people to touch the live wires under any situation. The extra-space or compartment (49) under the track-means (40) can offer space to store the electric-cord (45) and its plug (46) or other electric parts and components such as surge protection parts and accessories, or a switch, sensor, lighting, blue tooth device, PIR device, or motion sensor device to provide multiple functions for the outlet-device according to market requirements.

Figure 5:
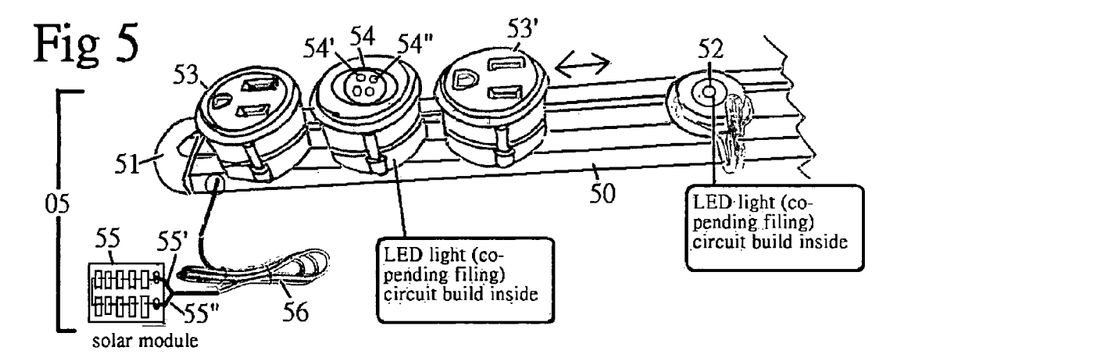
FIG. 5 shows details of a fourth preferred embodiment of an outlet device with changeable position features, including a solar power source with electric cord to supply power to the outlet-units and other devices.

As shown in FIG. 5, the outlet device (05) includes track-means (50) with a plurality of outlet-units (53) (53') and another device (54). Each outlet-unit (53) (53') has a three socket-set receiving-areas with three corresponding resilient contact means to make an electric electrical connection with the device's bus-means (not shown) on the button of each outlet-unit. In this preferred embodiment, the resilient contact means is a solid cylinder-metal piece. The electric signal delivered from the bus-means (not shown) to each outlet-unit (53) (53') needs to be very large so the contact means needs to be a solid cylinder metal piece so as to carry enough electric signal from one end to other end. If a metal spring is used, a big problem of results because the spring cross-section is way too small to allow the large amount of electric signal required. The other device (54) may be an LED light unit which has a plurality of LEDs (54") inside with a built-in circuit to connect with bus means and provide LED illumination with removable features as described in various ones of my copending applications cited above. The electric signal source of this preferred embodiment is a solar electric source (55) with output-ends (55') (55") that connect with an electric cord (56) and in the track-means (50) though the hole of the track-means.

Figure 6:
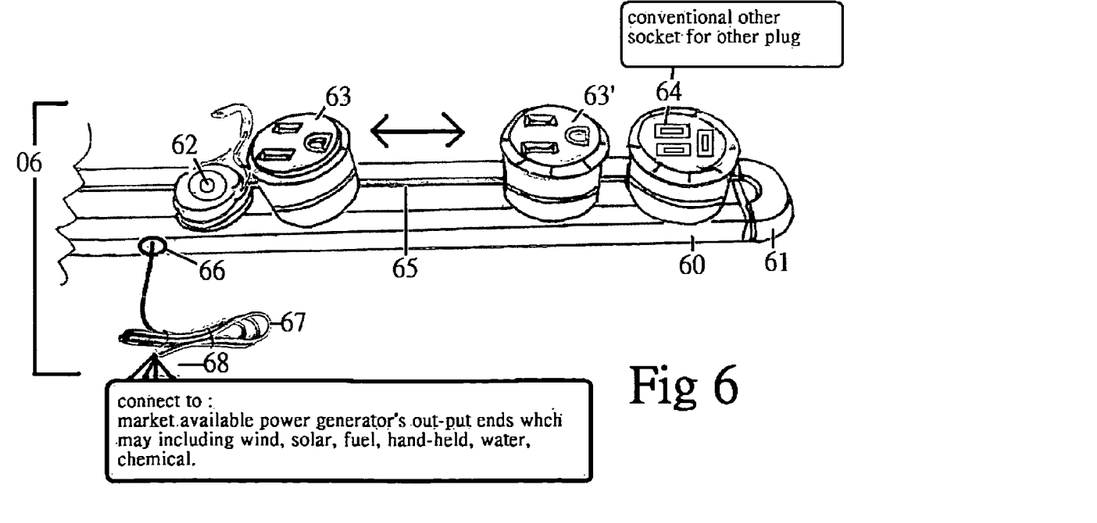
FIG. 6 shows details of a fifth preferred embodiment of an outlet device with changeable position features, including another power source with electric cord to supply power to the outlet-units and other devices, the other power source being optionally selected from a wall outlet, solar power, wind generator, electric signal generator (sound, audio, video), or any equivalent electric signal source which can supply power to another device to provide desired functions and still fall within the current invention's scope, the outlet-units having different socket sets as desired to meet the requirements of the convention market for communication, computer, and consumer electronic devices.

As shown in FIG. 6, a track-means (60) has three outlet-units (63) (63') and (64) that fit within the track-means (60). The outlet-unit (64) has a socket set that is different from the standard type of the socket-set because it is for a special plug. This exemplifies how the current invention may be used for any kind of socket-set and special plugs available from the conventional market. It will also be appreciated that all other kinds of socket-set for different electric device may be provided, including socket sets that utilize a wall outlet, solar power, wind generator, electric signal generator (sound, audio, video), or equivalent electric signal source to supply power to another device to provide desired functions, any of which may still fall within the current invention's scope.

Figure 7:
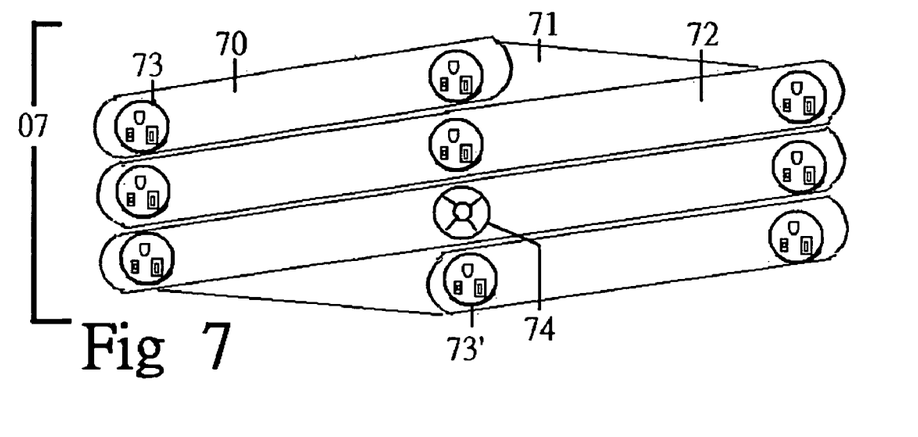
FIGS. 7, 8, 9 show various alternative or equivalent arrangements of an outlet device with changeable position features, in which the outlet device may in the form of a strip or tape.

As shown in FIG. 7, the extendable outlet device (07) has a long housing means (72), short housing means (70), and joint means (71) with outlet-units (73) (73') and other device (74). When the housing means (70) (72) or joint means (71) is expanded to be wider, the positions of all the related outlet-units (73) (73') and other device (74) are changed accordingly.

Figure 8:
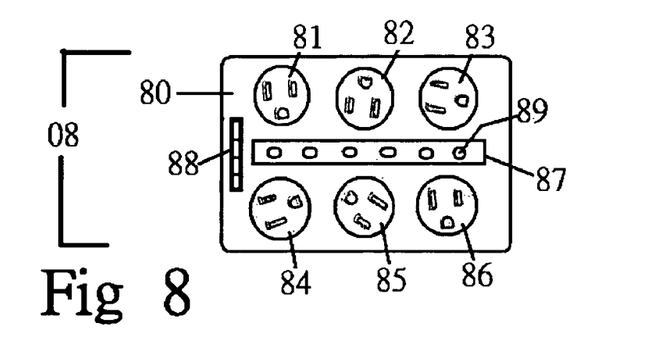

As shown in FIG. 8, the outlet device (08) has a shape (80) with six outlet-units (81) (82) (83) (84) (85) (86) having their own contact-means (not shown) to connect with inner bus means. Each outlet-unit has a preferably clip-type (not shown) contact means so it can be clipped on the wall-thickness of the bus means (not shown). Each of the clip-type contact means can have a different angle so all outlet-units will have different orientation. These outlet-units will not rotated but can be replaced easily and change position while as needed because each contact means is a clip-type so it can be easily replaced by simple dis-assembly of the safety screw and re-assembly.

Figure 9:
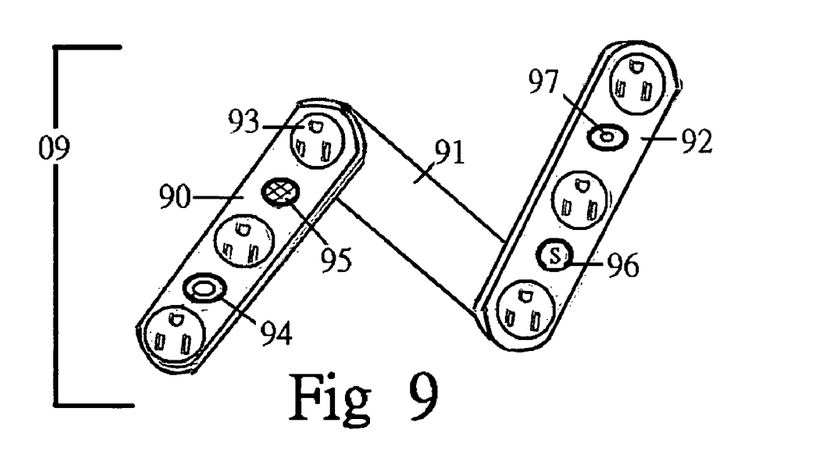

The embodiment of FIG. 9 is the same as that of FIG. 1 and FIG. 3, except that the outlet device (09) has a lot of different outlet-units (92) (96) (95) (94) with different functions achieved by connecting the outlet-units with inner buss-means to provide the proper functions.

Figure 10:
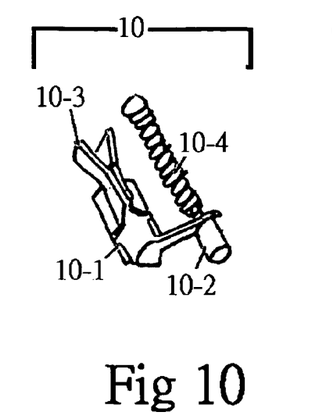
FIGS. 10, 11, 12, 13 show details of the construction of the second preferred embodiment, and in particular details of the optional construction of components that deliver an electric signal from the track-means to the outlet-units.
Figure 11:
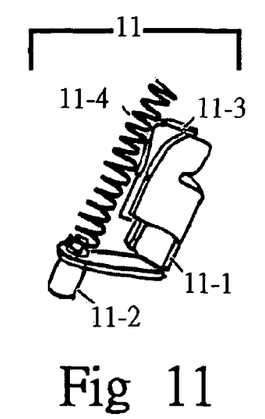
Figure 12:
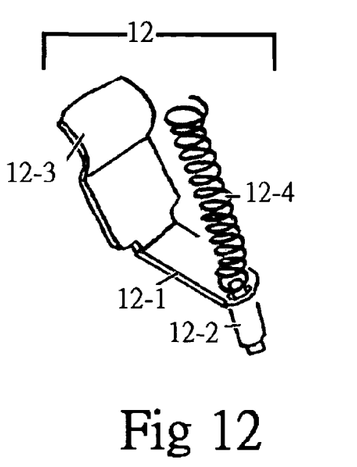

As shown in FIGS. 10, 11, 12, a cylinder-type (10-2) (11-2) (12-2) contact-means is provided to deliver a large electric signal. The above-cited copending application Ser. No. 12/149,963, entitled "removable LED light device," discloses a design for resilient conductive means I the form of a "metal spring" to supply an electric signal for delivery to an LED-unit. However, the metal spring is too thin with a very tiny cross-section to allow a large current to be delivered from end to end.

The current invention needs to deliver a large electric signal such as 110V, 60 Hz current with multiple thousand watts. Hence, the current invention utilizes a redesigned super heavy duty contact-means, conductive means, resilient conductive means with a large cross-section of the metal area to meet the safety standard. Hence, all of the metal piece joint-points have to have a sufficiently large cross-section area to provide the large electric signal.

As shown in FIG. 10, the conductive means (10-1) with socket-set receiving-area (10-3) is connected with a cylinder-type contact-means (10-2) incorporating a super heavy elastic, resilient conductive means to that keeps the best resilient properties to ensure the best electric connection with bus-means (not shown). The resilient conductive means (hereof, a metal spring (10-4)) offers strong elastic and resilient properties to the cylinder-type contact-means (10-2). The incoming plug means (not shown) will make electric connection with the conductive means (10-1) at the clip-type of receiving-areas (10-3).

As shown in FIG. 11, the conductive means (11-1) has a socket-set receiving-area (11-3) and connects with the cylinder-type of contact-means (11-2) having super heavy resilient conductive means to offer the best elastic properties and make good electric connection with the bus-means. The resilient conductive means (hereof a metal spring (11-4)) offers strong elastic and resilient properties to the cylinder-type contact-means (11-2). The incoming plug means (not shown) will make electric connection with the conductive means (11-1) at the clip-type of receiving-areas (11-3).

As shown in FIG. 12, the conductive means (12-1) has a socket-set receiving-area (12-3) and connects with the cylinder-type contact-means (12-2) having super heavy resilient conductive means to offer the best elastic properties and make good electric connection with bus-means. The resilient conductive means (metal spring (12-4)) offers strong elastic and resilient properties to the cylinder-type contact-means (12-2). The incoming plug means (not shown) will make electric connection with the conductive means (12-1) at the curved-type of receiving-areas (12-3).

Figure 13:
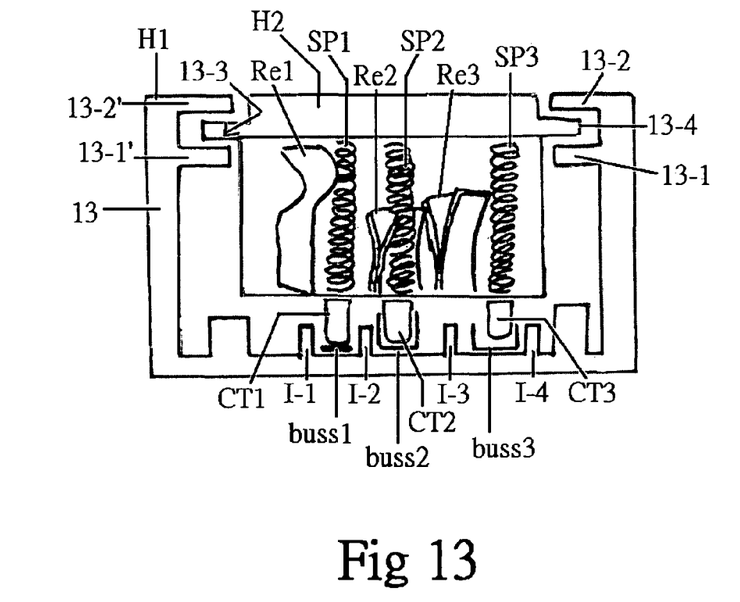

FIG. 13 shows a cross-section of the second preferred embodiment, which has a track means (H1) having a geometric shape that allows the outlet-unit (H2) to fit within. The outlet-unit (H2) has socket-set receiving-areas (Re1) (Re2) (Re3) with resilient conductive means (SP1) (SP2) (SP3) to provides its own contact-means (CT1) (CT2) (CT3) with super perfectly resilient properties and enables the cylinder-type contact-means (CT1) (CT2) (CT3) to contact with the outlet device's bus-means (buss1) (buss2) (buss3) to deliver a large electric signal from an electric signal source (not shown) to the socket-set's receiving-areas (Re1)(Re2) (Re3). The outlet-unit (H2) has an edge (13-4) that fits within the trace means (H1)'s two walls (13-1) (13-2) to hold the outlet-unit in position tightly, while being removable along the trace-means (H1) elongate length. The outlet-unit (H2) will be easily moved within the two walls to a desired position as needed to accommodate different size plug means (not shown). It is not necessary to provide a rotatable outlet-unit for this easily removable outlet device.

Figure 14:
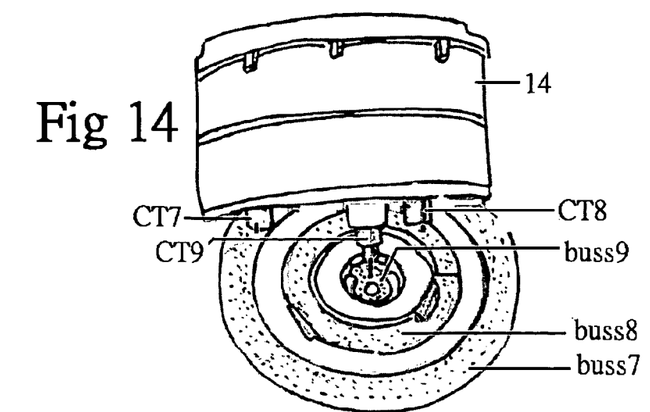
FIGS. 14, 15 show details of the contact means and bus means of the second preferred embodiment, including resilient conductive means (spring), conductive means (metal piece), receiving areas, plug input-holes, and fastening means of one of the arrangements which are available from marketplace.

FIG. 14 shows details of the relation between the resilient contact-means (CT7) (CT8) (CT9) and its corresponding bus means (buss9) (Buss10) (buss10).

Figure 15:
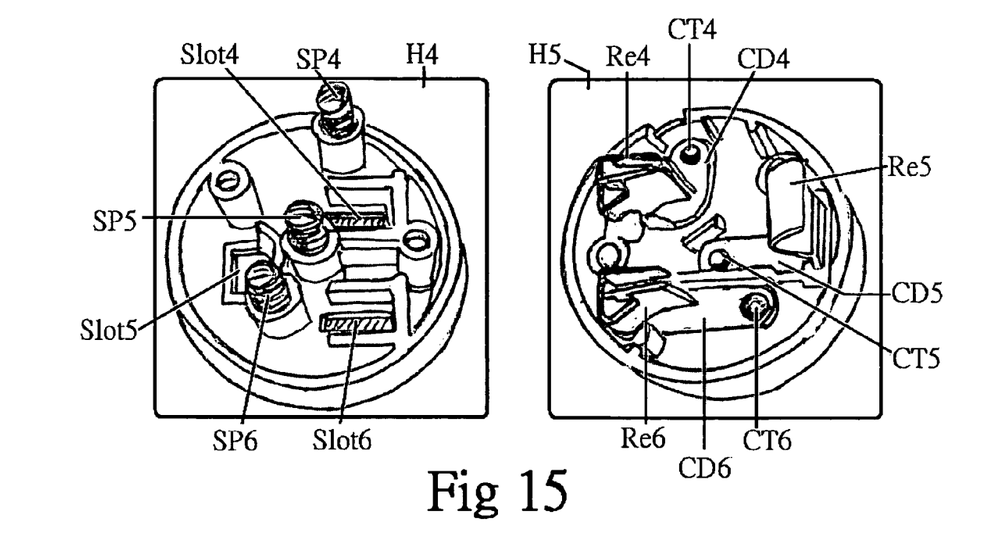

FIG. 15 shows one of the available arrangements for contact means (CT4) (CT5) (CT6), corresponding resilient conductive means (SP4) (SP5) (SP6), and corresponding conductive mean's socket-set receiving-areas (Re4) (Re5) (Re6) of the conductive means (CD4) (CD5) (CD6) to enable a plug to be inserted into the related holes (Slot4) (Slot5) (Slot6). A fastening means holds the rectangular housing (H4) (H5) together, for example by means of a screw, rivet, glue, ultrasonic sealing, chemical compound, etc.

Figure 16:
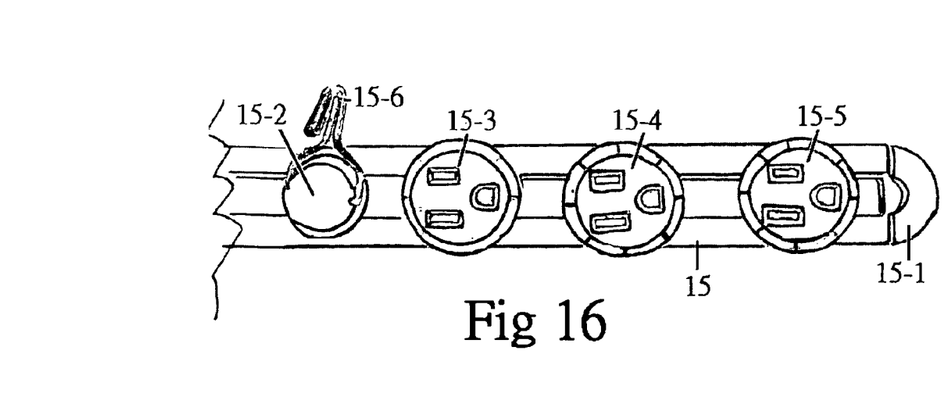

FIG. 16 shows the same track arrangement as FIG. 2 but with different geometric shapes for the outlet-units and socket-sets of the receiving areas.

Figure 41:
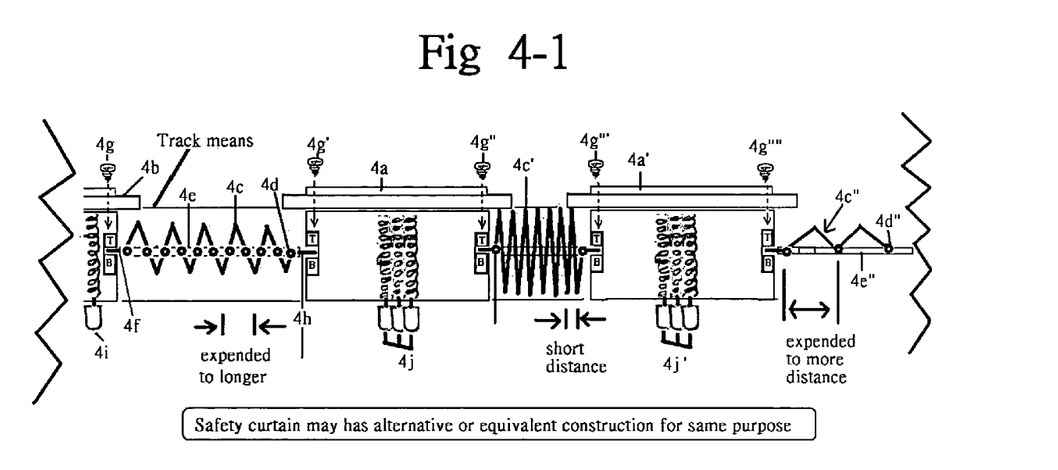

FIG. 4-1 shows one of the preferred safety curtains (4c) (4c') (4c") between the outlet-units. The safety curtain (4c) is between outlet-units (4b) (4a), with the space expanded to be longer. The safety curtain (4c') is between outlet-units (4a) (4a') with the space being at its shortest distance. The safety curtain (4c") is between outlet-units (4a') (4a"—not shown) and the space is longer to look more flat. The safety curtain (4c) (4c') (4c") are flexible, expandable, and/or extendable with durable properties provided by a rubber material, polycarbonate, or other equivalent material with desired construction and thickness to meet safety standards. The safety curtain (4c) has two ends (4d) (4f) to fasten between the outlet-unit's walls (T) (B) by fastening means (4g) so that it can be attached on the outlet-unit with reliable installation. Any alternative or equivalent method to get the same functions for the safety curtain may be applied without departing from the scope of the current invention.

Figure 17:
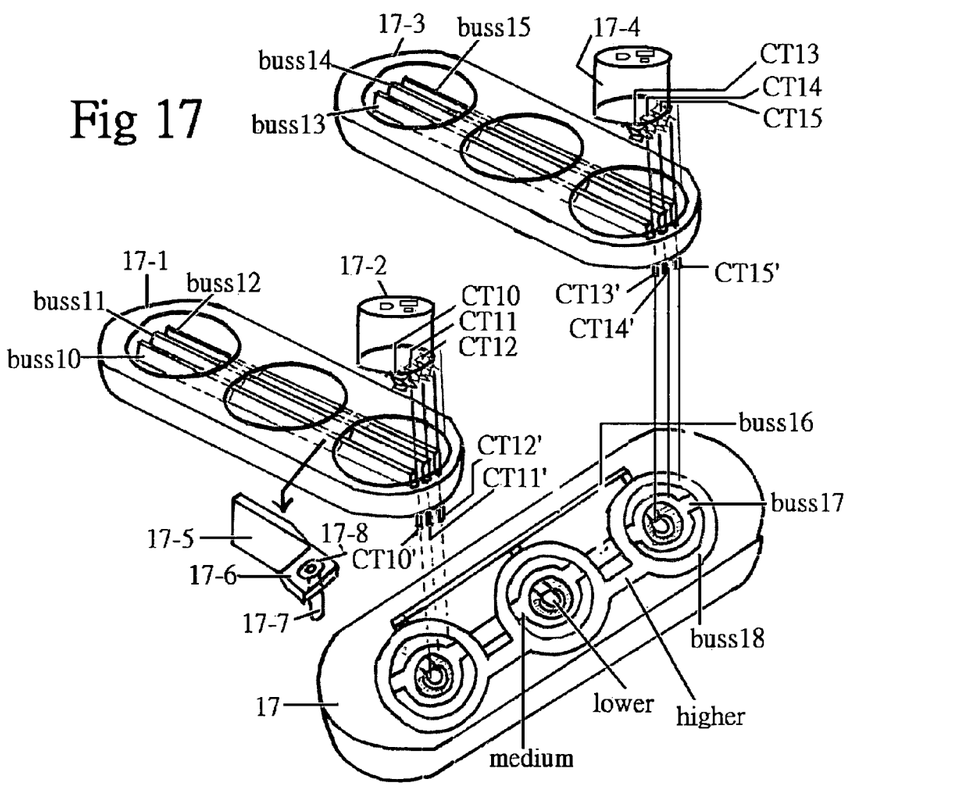
FIG. 17 shows a preferred construction of the outlet-units and bus means, and contact means of the first preferred embodiment for connecting with different levels of a bus means to deliver electric signals from the first housing means through a first joint means to a second housing means.

FIG. 17 shows details of the first preferred embodiment, in which the housing-means (17-1) is assembled with joint means (17) and housing means (17-3). The housing means (17-1) has a built-in bus means (buss10) (buss11) (buss12) with related cylinder-type contact means (CT10') (CT11') (CT12') to enable electric connection with the bus means (buss18) (buss11) (buss16). The outlet-unit (17-2) has clip-type contact-means (CT10) (CT11) (CT12) to clip on the buss-means (buss10) (buss11) (buss12) within the housing-means (17-1). A large electric signal travels within the bus means (buss 16) (buss11) (buss18) of the joint-means (17) and each of the bus means are on a different level (height) so as to have proper isolation between each of the bus means in a tiny space.

The large electric signal travels from the left end and enters the right end of the joint-means. The bus-means (buss16) (buss17) (buss18) are connected with the cylinder-type contact-means (CT13') (CT14') (CT15') so the large electric signal can be delivered to the bus-means (buss13) (buss14) (buss15) of the housing-means (17-3), and from there to the outlet-unit's (17-4) contact-means (CT13) (CT14) (CT15), and finally to the socket-set's receiving-areas of the outlet-unit (17-4).

As shown in FIG. 17, the outlet-unit (17-2) (17-4) fits within the housing-means (17-1) (17-3) and can be fixed by clip-on, catch up, screw in, or other fixing means available from the marketplace. The outlet-unit can therefore be replaced whenever needed. Each outlet-unit has clip-type contact-means (CT10) (CT11) (CT12) (CT13) (CT14) (CT15) that can easily make electric connection with bus-means (buss10) (buss11) (buss12) (buss13) (buss14) (buss15) without the need to rotate the outlet-units because the housing means (171) (17-3) can be rotating along the joint-means (17).

Figure 18:
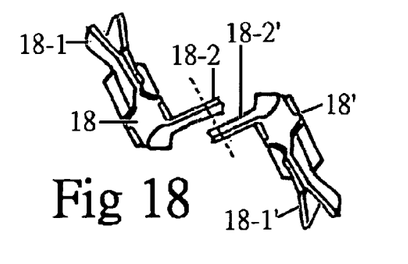
FIGS. 18, 19, 20, 21 show a preferred construction of each component for the outlet-units of the first preferred embodiment, together with related parts and accessories to deliver electric signals from the housing to the outlet-units.
Figure 19:
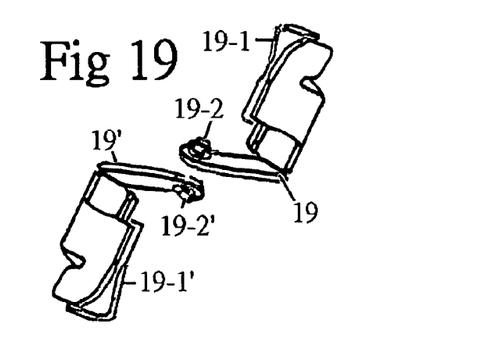
Figure 20:
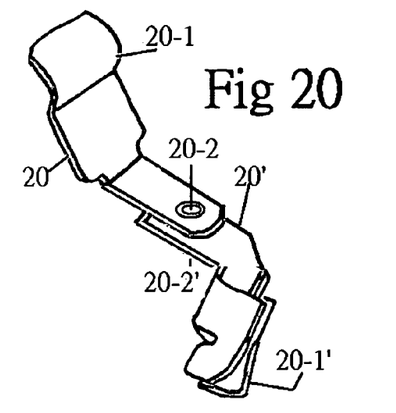

As shown in FIG. 18, FIG. 19, and FIG. 20, each conductive means (18) (19) (20) has its socket-set receiving-areas (18-1) (19-1) (20-1) and flat end (18-2) 919-2) (20-2) with a hole to connect with clip-type contact-means (18-1') (19-1') (20-1') at the lower rivet area (18-2') (19-2') (20-2').

Figure 21:
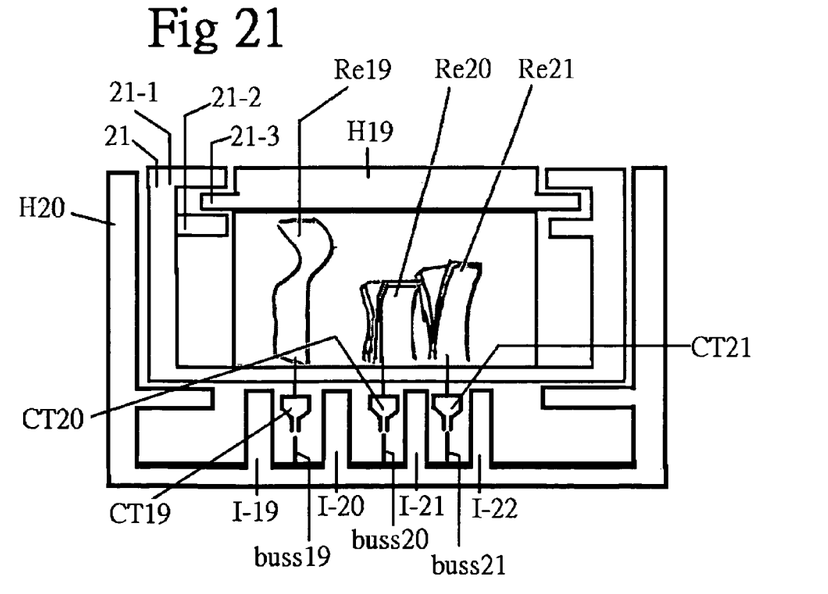

As shown in FIG. 21, the outlet-unit (H19) fits within the housing-means (H20). The outlet-unit has its socket-set receiving-areas (Re19) (Re20) (Re21) with corresponding clip-type contact-means (CT19) (CT20) (CT21) to connect with the housing-means (H20') bus-means (buss19) (buss20) (buss21) to deliver a large electric signal from outlet-units (H19) to housing means (H20) and its cylinder-type contact-means (not shown). Each of the bus-means (buss19) (buss20) (buss21) is divided by walls (1-20) (1-21) (1-22) to make sure no electric hazard can happen in any situation.

Although the above discussed and mentioned preferred embodiments show the scope of the current invention, it will be appreciated that any alternative or equivalent design, construction, modification, process, installation, or up-grade still fall within the scope of the invention, which is not limited to the above-discussed and mentioned details.

The invention claimed is:

1. An outlet device with position changeable features and arranged to include multiple outlet units, comprising:
   at least one said outlet unit;
   a track means for supporting and supplying electric power to each of the outlet units included in the outlet device,
   wherein the outlet unit includes a plurality of socket set receiving areas and conductive means for supplying electric power from a bus means in the track means to an electrical device plugged into one of the socket set receiving areas,
   wherein a position and orientation of the outlet unit within the track means are readily removable and changeable along a length of the bus means,
   wherein the outlet device has a geometric shape, design, dimensions and space adapted to arrange or store circuit means, said bus means, contact means, a resilient conductive means, said conductive means, and socket set receiving areas for ensuring electrical delivery between said socket set receiving areas and said bus means, the improvement wherein at least two of the bus means are arranged at different levels within the track means to supply electric power in the form of alternating or direct current from an electric power source to the outlet unit, and each socket set receiving area in the outlet unit includes at least a resilient contact means to connect with the bus means and allow the outlet units to freely move and change position when the outlet unit is moved, no wires are included in the electrical connection between the contact means and the socket set receiving areas within the outlet unit, and a length of the track means is longer than a total length of all outlet units positioned within the track means to allow the outlet units to freely move and change position.

2. An outlet device with position changeable features, comprising:

at least one readily removable outlet unit arranged within a housing means or a joint means, wherein a position and an orientation of the outlet unit is changeable when the housing means or joint means is moved in any direction in an x-y plane to change the position or orientation of the outlet unit, wherein the outlet unit has a geometric design, shape, and construction that fits with the housing means or joint means and enables connection of the outlet unit with an electric signal source, wherein each outlet unit includes a plurality of socket set receiving areas and conductive means, resilient conductive means, contact means and bus means for supplying electric power from the bus means in the track means to an electrical device plugged into one of the socket set receiving areas, wherein the outlet device has a geometric shape, design, dimensions and space adapted to arrange or store circuit means, said bus means, contact means, a resilient conductive means, said conductive means, and socket set receiving areas for ensuring electrical delivery between said socket set receiving areas and said bus means to allow said outlet units to freely move and change position or orientation when the outlet unit, housing unit, or joint means is moved, the improvement wherein at least three of the bus means are installed at different levels on the outlet device and isolated from other bus means to deliver electric power from an electric power source to the socket set receiving area, and each socket receiving area includes at least said resilient contact means to connect with the bus means, no wires are included in the electrical connection between the contact means and the socket set receiving areas within the outlet units, and at least two of the outlet units are arranged on each of the housing means or joint means, said outlet units arranged on the housing means or joint means being rotatable and arranged to make contact with multiple circular contact areas to ensure electrical contact with said resilient contact means inside a respective outlet unit during rotation of the respective outlet unit, or said outlet units being fixed in position on said housing means or joint means so as to rotate with said housing means or joint means as said housing means and joint means rotate relative to each other.

3. An outlet device with position changeable features as claimed in claim 1 or 2, wherein the socket set receiving areas of the outlet units have a geometric shape and specifications to receive a plug device and supply electric power to the plug device, said electric power having a predetermined voltage, current, pulse configuration, and frequency.

4. An outlet device with position changeable features as claimed in claim 1 or 2, wherein the outlet device is arranged to supply electric power from an electric power source selected from the group consisting of a wall outlet, solar power, wind generator, audio or video device, or equivalent electric signal source which can supply power to another device to provide desired functions.

5. An outlet device with position changeable features as claimed in claim 1 or 2, wherein said outlet device in which the position or location is changed by a movement selected from the group consisting of rotation, jumping a gap, extension, folding, distance changing, extraction, connection, disconnection, retraction, expansion, addition, adjustment, bending, overlapping, underlaying, assembly, disassembly, and flexing.

6. An outlet device with position changeable features as claimed in claim 1 or 2, wherein said outlet device has a predetermined shape and size sufficient to accommodate parts of the outlet device for supplying electric power, including said conductive means and said contact means.

7. An outlet device with position changeable features as claimed in claim 1 or 2, wherein the resilient contact means is selected from the group consisting of a clip, snap, or cylindrical shape having resilient properties to ensure electrical connection with the bus means.

8. An outlet device with position changeable features as claimed in claim 1 or 2, wherein said contact means is arranged on the outlet unit to connect with said bus means.

9. An outlet device with position changeable features as claimed in claim 1 or 2, wherein said outlet device includes a plurality of said outlet units, each having its own contact means, conductive means, and resilient conductive means.

10. An outlet device with position changeable features as claimed in claim 1 or 2, wherein the outlet device has multiple functions selected from the group consisting of surge protection, power failure protection, audio in-out functions, video in-out functions, digital data transmission functions, blue tooth transmission, lighting, roller for wire functions, timer functions, sensor function, and switching to make the power device offer more functions to the consumer.

11. An outlet device with position changeable features as claimed in claim 1 or 2, wherein the outlet unit includes different socket sets selected from socket sets for consumer electric devices, communication devices, computing devices, lighting devices, bluetooth devices, telephone devices, and other electrical devices.

12. An outlet device with position changeable features as claimed in claim 1 or 2, wherein said outlet device includes space for wires and a plug of the outlet device to be stored while using an alternating current power source, wind generator, or other electric generator device.

13. An outlet device with position changeable features as claimed in claim 1 or 2, wherein the outlet device accommodates a solar module and power storage means for the solar module.

14. An outlet device with position changeable features as claimed in claim 1 or 2, further comprising a safety curtain for isolating all conductors having a high voltage and current to prevent the conductors from being touched by a user.

15. An outlet device with position changeable features as claimed in claim 1 or 2, wherein said contact means is arranged to contact different bus means on different levels.

16. An outlet device with position changeable features as claimed in claim 1 or 2, wherein the outlet device has a strip or tape shape.

17. An outlet unit for a position changeable outlet device, comprising:

wherein the outlet unit has a geometric design, shape, and construction that fits with the outlet device and enables connection of the outlet unit with an electric signal source,     wherein said outlet unit includes a plurality of socket set receiving areas and conductive means for supplying electric power from a bus means in the track means to an electrical device plugged into one of the socket set receiving areas,     wherein each socket set receiving area in the outlet unit includes at least a resilient contact means to connect with the bus means and the conductive means such that there are an equal number of contact means and socket set receiving areas, and     wherein said outlet unit is readily removable from said bus means in the track means, thereby enabling said outlet unit to be replaced in said track means by another outlet unit and also enabling different numbers of said outlet unit to be connected to said bus means.

\* \* \* \* \*